United States Patent
Brown, Jr.

[15] 3,659,993

[45] May 2, 1972

[54] APPARATUS FOR FORMING CONTAINERS

[72] Inventor: Fred P. Brown, Jr., Centerville, Mass.

[73] Assignee: Packaging Industries, Inc., Hyannis, Mass.

[22] Filed: Oct. 24, 1969

[21] Appl. No.: 869,249

[52] U.S. Cl..............................425/214, 425/317, 425/394
[51] Int. Cl.......................................................B29c 17/02
[58] Field of Search....................18/4 R, 4 P, 19 H, 4 B, 19 R, 18/5 A, 19 F

[56] References Cited

UNITED STATES PATENTS

| | | | |
|---|---|---|---|
| 3,105,270 | 10/1963 | Fibish | 18/19 F |
| 3,115,677 | 12/1963 | Thiel | 18/19 F |
| 3,329,995 | 7/1967 | O'Brien et al. | 18/4 R |
| 3,504,074 | 3/1970 | Snow | 18/4 P UX |

Primary Examiner—Robert L. Spicer, Jr.
Attorney—Kenyon & Kenyon

[57] ABSTRACT

Apparatus for forming containers from webs of plastic material is disclosed as including a forming machine and a web tensioning and feeding apparatus. The web tensioning and feeding apparatus feeds the plastic material to the forming machine in accordance with the consumption of plastic material by the forming machine and maintains a relatively constant tension in the plastic fed to the forming machine. The forming machine forms containers from the plastic material and includes printing apparatus for printing on the formed containers. The printing apparatus includes a platen with a roller adapted to be rolled on the platen to ink the platen so it can subsequently print on the container. Means are provided for disengaging the forming, blanking and printing devices from the main power drive and bringing these devices to a complete and instantaneous halt even while the motor is running.

5 Claims, 13 Drawing Figures

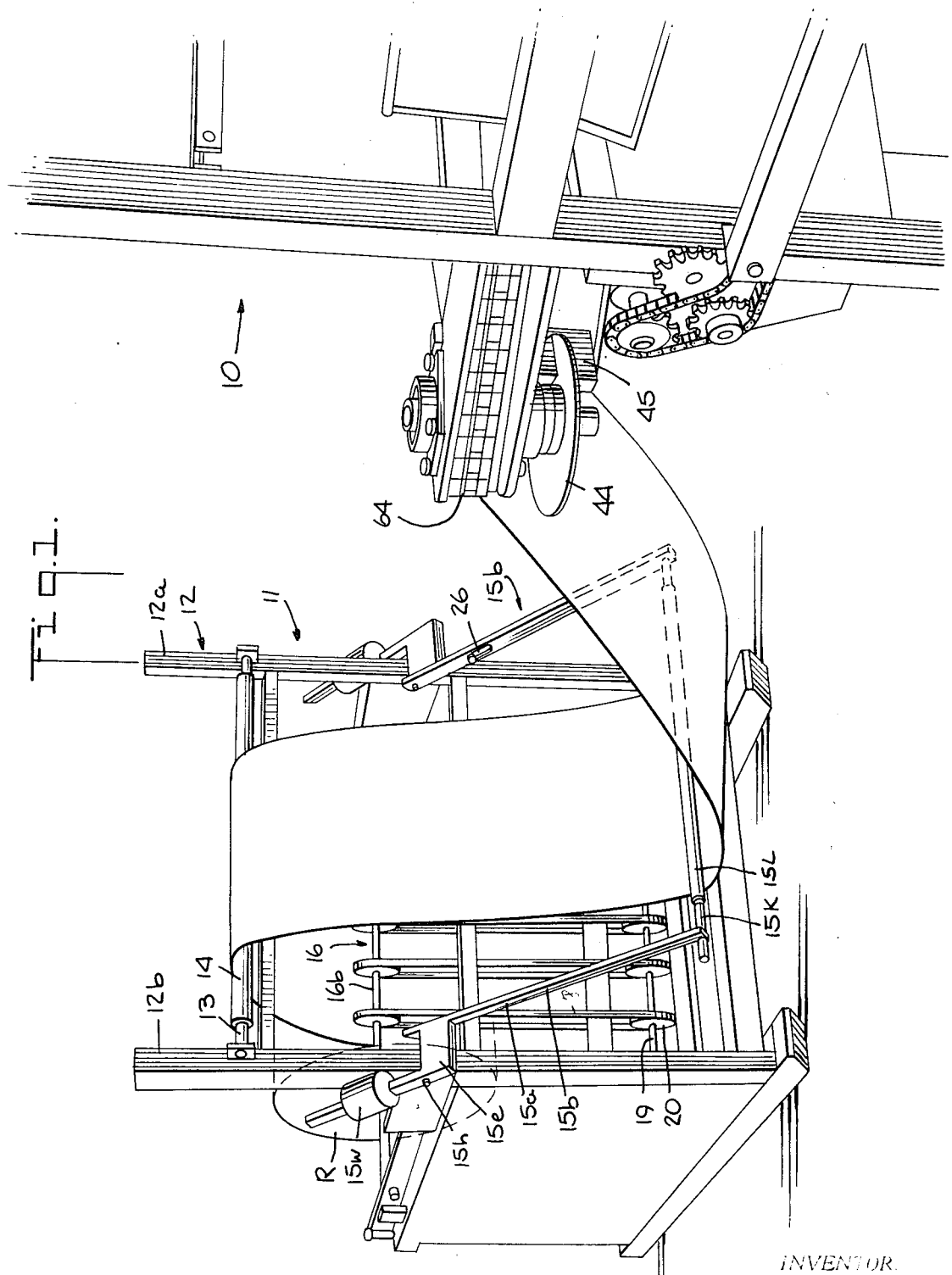

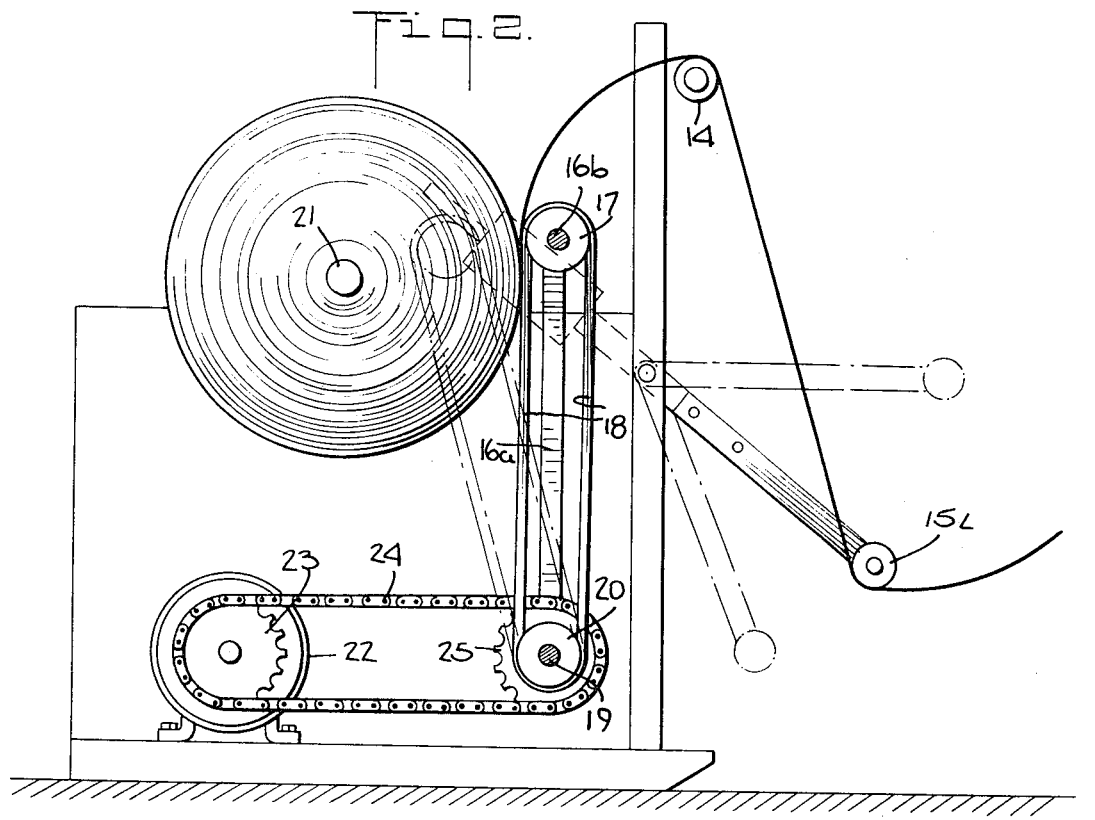
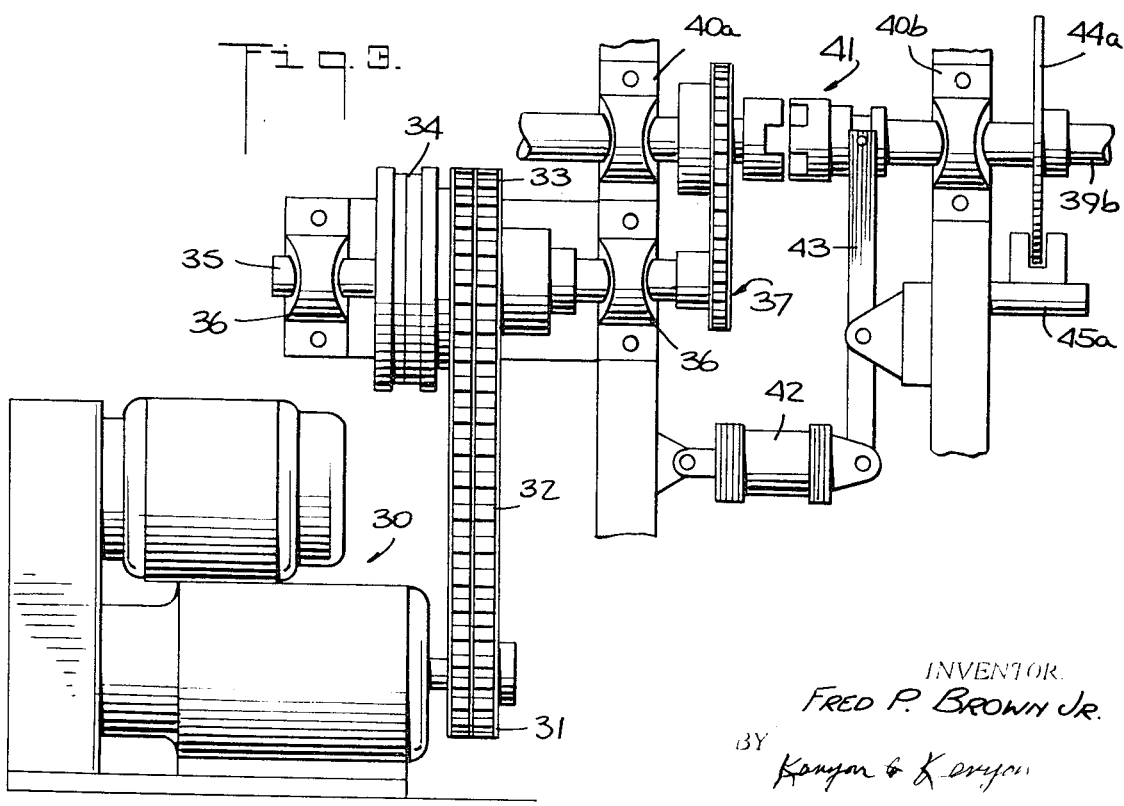

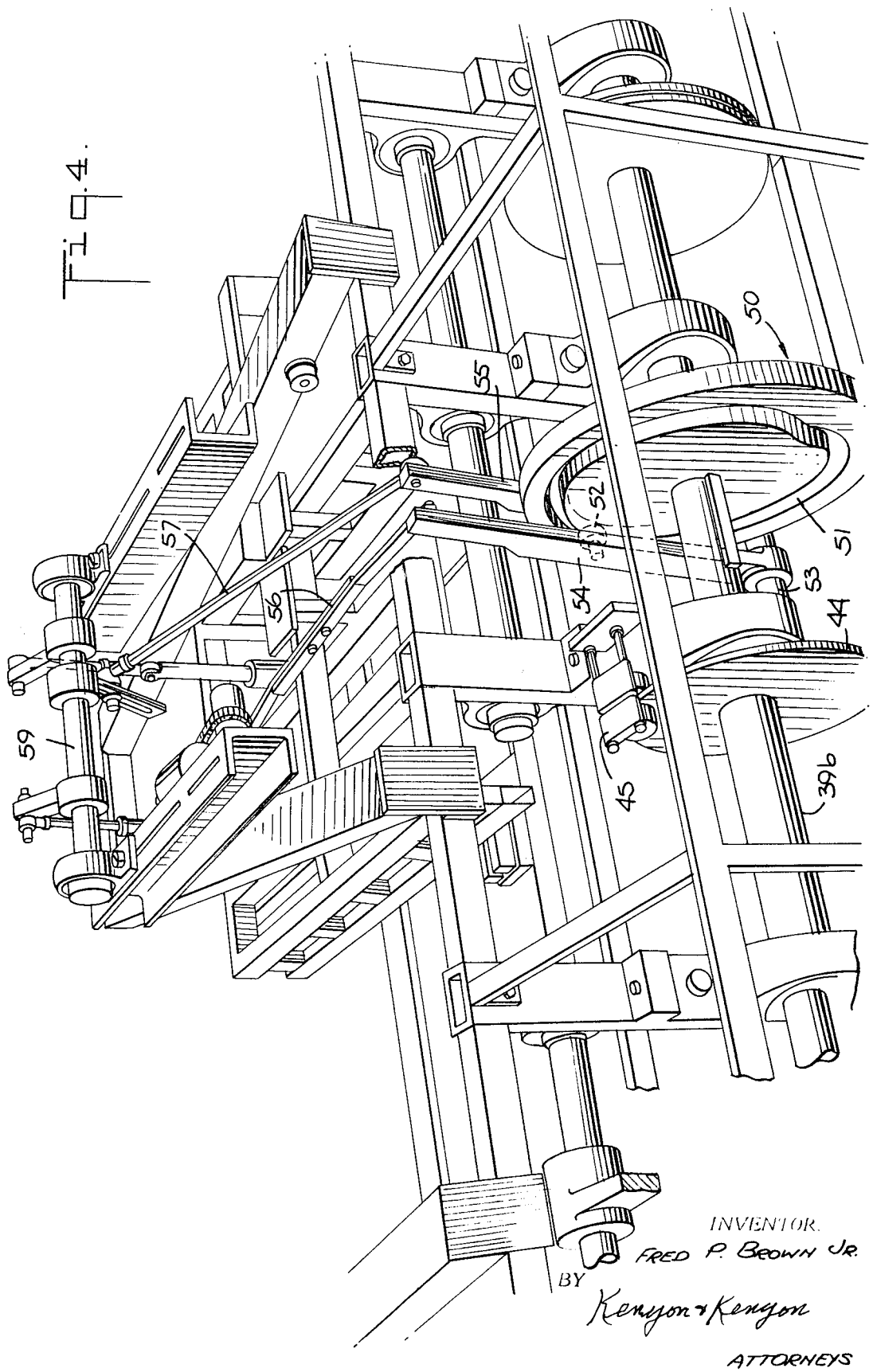

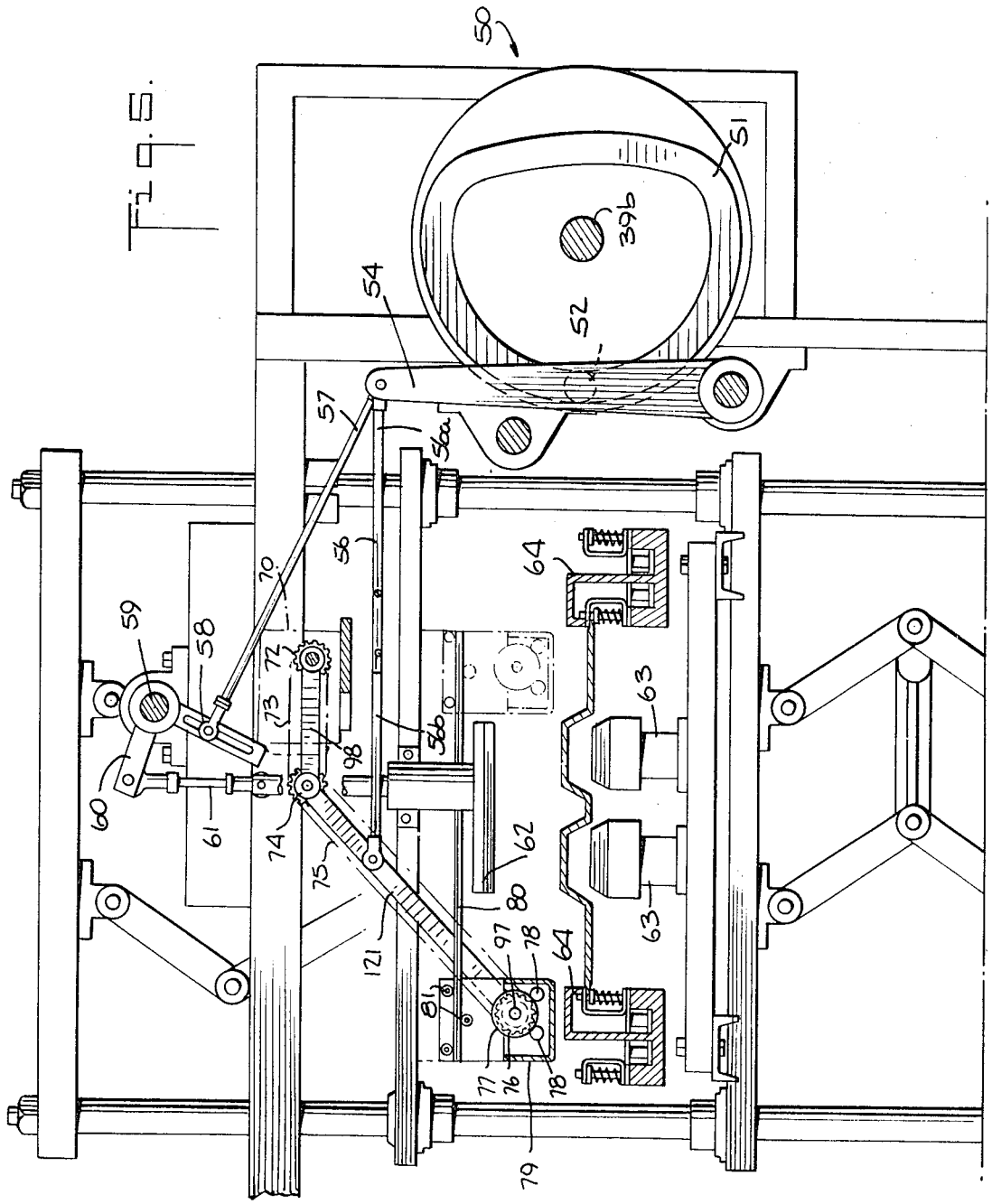

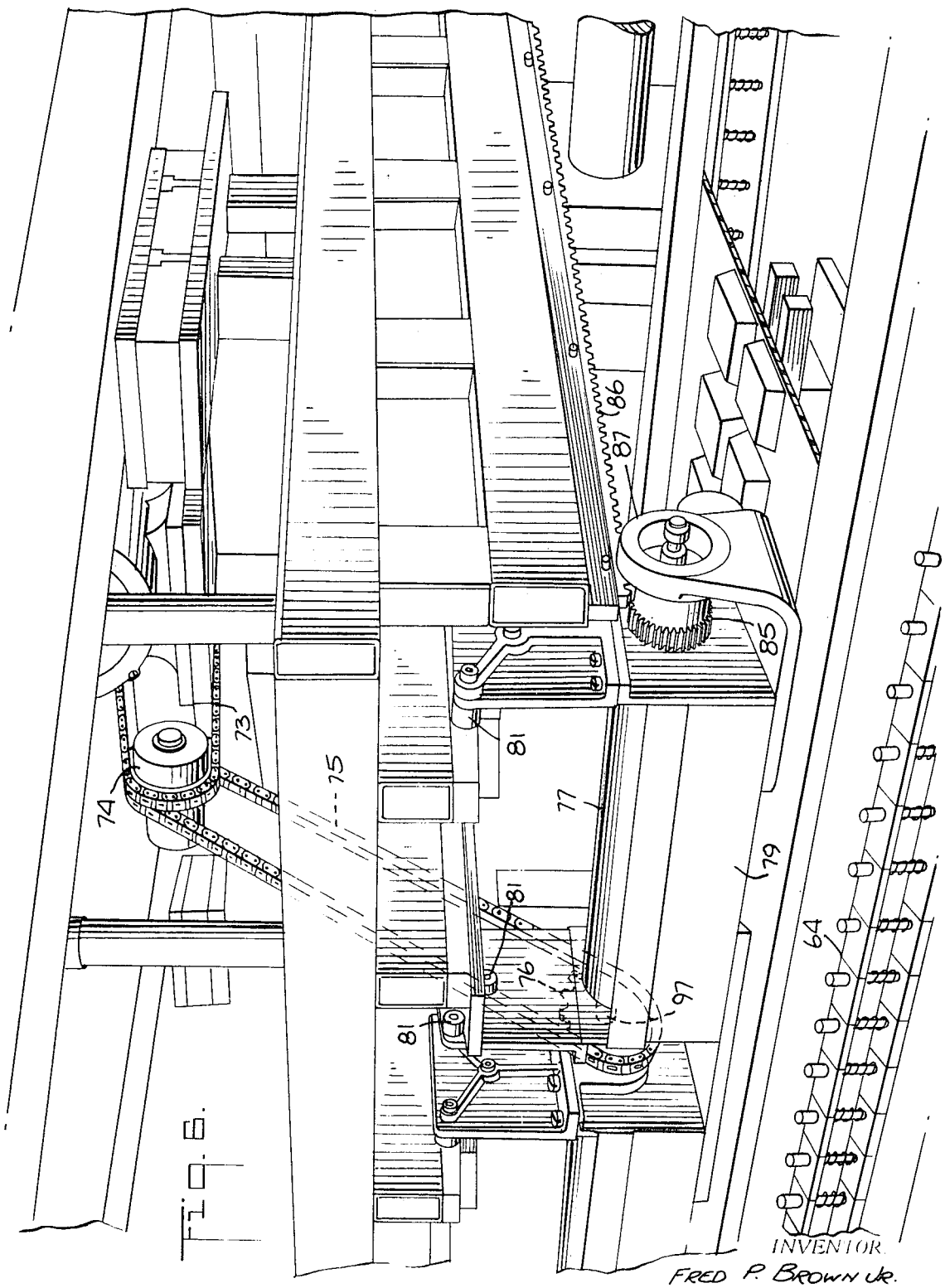

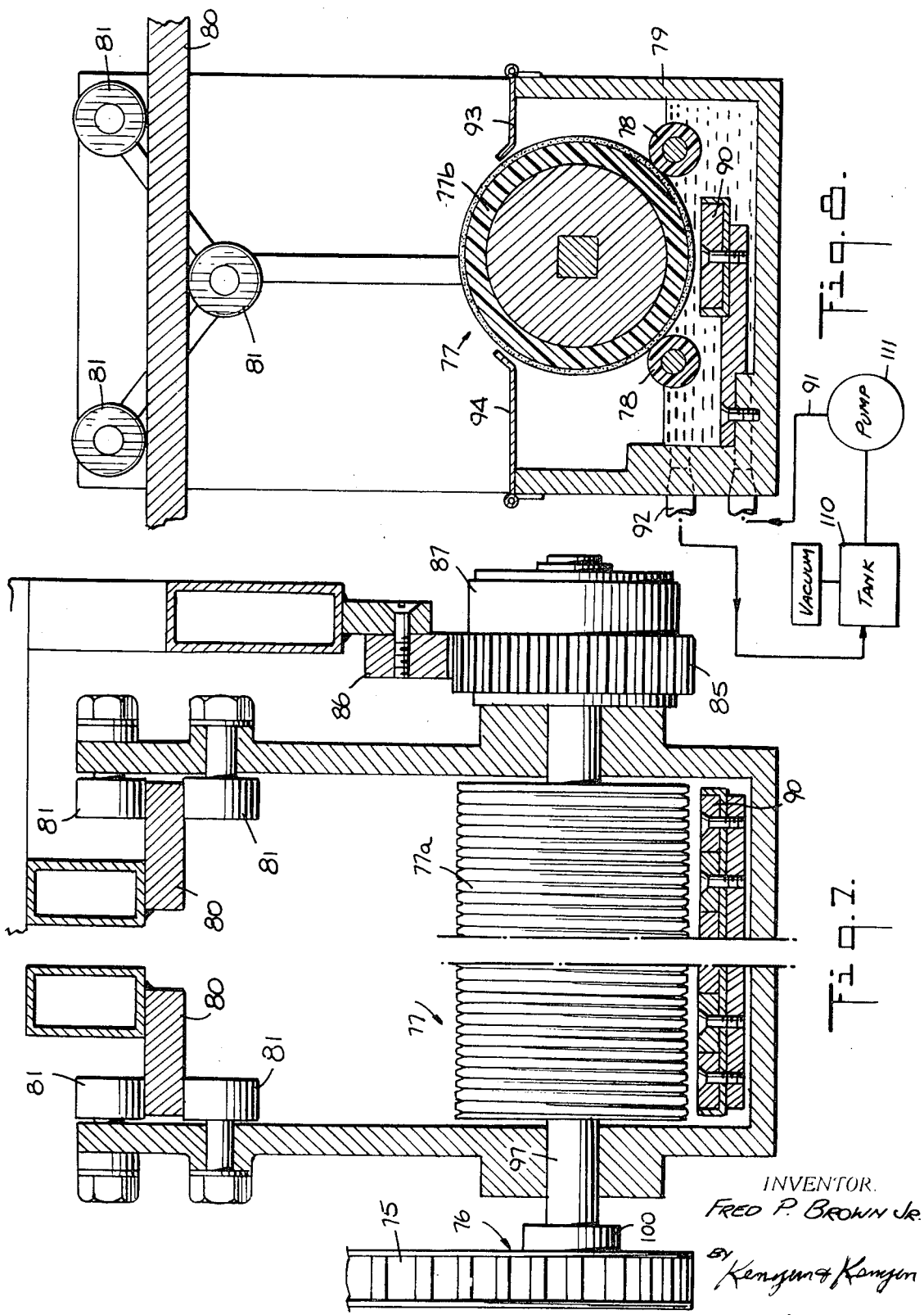

APPARATUS FOR FORMING CONTAINERS

BACKGROUND OF THE INVENTION

1. Field of the Invention

This invention relates to an improved method and apparatus for forming articles such as containers, and more particularly to specific improvements to the method and apparatus for forming containers disclosed in my co-pending patent application "Method and Apparatus for Forming Containers" filed Apr. 11, 1969 and having Ser. No. 815,292 and assigned to the same assignee as the assignee of the instant application.

As is well known to those familiar with the packaging art, plastic containers are being utilized for packaging materials for food products in an ever increasing amount due to their great ease of manufacture, strength, durability and versatility. The advantages of using plastic materials for packaging materials for food products are that they have an attractive appearance, provide great protection to the product being packaged and are easily formed into configurations which heretofore were not possible with conventional type materials.

2. Description of the Prior Art

Prior to the machine disclosed in my co-pending patent application it was extremely difficult with prior art forming machines to form containers from webs of plastic material in an economical and efficient manner. The reason for this was that many of these prior art machines did not have the production rates necessary to keep the cost of making the containers economically feasible. Additionally, many prior art machines which were used to form plastic containers were not flexible enough to facilitate rapid changeover from one container configuration to another. A further drawback of some of these prior art machines was that they did not provide means to insure that the formed plastic material did not return to its original configuration or as is known in the art, overcome its memory. A further drawback of some of the prior art forming machines was that they did not provide efficient and accurate heating means to heat soften the plastic material before it was thermoformed. This often resulted in excessively heating the plastic and thus producing a container with a non-uniform thickness.

The method and apparatus disclosed in my above-identified co-pending patent application provided a method and apparatus which overcame the above-mentioned deficiencies associated with prior art forming machines. This was accomplished in the machine disclosed in my co-pending patent application by feeding a web of plastic material from a large continuous roll into the machine where the web was gripped by members which intermittently advanced the material through the entire length of the machine. The gripping members engaged each side of the web of plastic material to hold the material in a substantially horizontal plane during each of the operations required to form the container.

The material which was gripped by the gripping members was first advanced to an accurately controlled heating station which heat softened the material and by being accurately controlled insured that the containers formed from the material were of a uniform thickness.

The heated plastic material was then advanced to a forming station wherein dies having the desired container configuration engaged the plastic material and formed it into a container having the configuration of the dies. Upon opening of the dies the formed container, which was still part of the continuous plastic web being advanced through the machine, was advanced to a printing station. At the printing station a printing platen was lowered into engagement with a portion of the container to impart a desired printed format thereto.

After the container had been printed it was subsequently advanced to a trimming and blanking station where the formed container was blanked from the continuous web of plastic material. The blanking apparatus was provided with means for stacking the severed containers one upon another prior to their removal from the machine.

As will be apparent to those skilled in the art, the invention disclosed in my co-pending patent application provided a machine which overcame the above-mentioned difficulties which heretofore were associated with prior art forming machines. While the machine disclosed in my co-pending patent application was effective in rapidly and efficiently forming containers from a web of plastic material it was specifically designed for use with oil base or other slow drying inks where the ink was applied against a printing platen prior to the platen being pressed against the formed container to print thereon. This provided an efficient technique of printing on the formed container with the apparatus which accomplished this result being designed to be utilized with oil base inks or other similar inks.

In many situations it is desirable to use rapidly drying inks such as a water or alcohol base ink, these inks being characterized by their ability to rapidly dry and by the desirability of evenly applying them to a platen to get good printing results. One such situation is when it is necessary to place items in the containers immediately after they have been formed and printed. This was not possible with the apparatus of my co-pending application since it was not designed to handle rapidly drying inks. This prevented items from being placed in the formed containers after they left the forming machine until the ink thereon had dried. This was because if items were placed in the containers as soon as they came out of the forming machine they would smear the still wet ink on the containers. This required storing the containers until the ink was dry, something that required a great deal of space with the rapid production speed of the machine.

Additionally, it has been found to be desirable in the forming machine disclosed in my co-pending patent application to maintain a predetermined tension in the web of plastic material which is being fed to the machine. In my prior co-pending patent application no means were provided to achieve this.

In my co-pending application there was no provision for bringing the main power shaft of the machine and the parts movable therewith to a complete halt. If a tool or other implement was by accident caught between the moving parts, such as the forming dies, there was no structure to immediately halt the movement of the moving elements of the machine to prevent the moving elements from being damaged as they were moved towards each other by the tool located between the path of travel of these elements. With the machine of my co-pending patent application the only way to bring the machine to a halt was to shut down the power to the main drive shaft or disconnect the main drive shaft from the drive motor. While this was successful in gradually bringing the drive shaft to a halt, the inertia of the parts which were movable with the drive shaft, such as the forming dies, the printing elements, etc., kept the drive shaft rotating for a short period of time after the drive motor had been shut off or the drive shaft was disconnected from the drive motor. This extra rotation of the drive shaft was undesirable in that it allowed the moving elements to continue to move towards each other for the period of time required to dissipate the inertia of the system and possibly be damaged by the tool located between the moving elements.

SUMMARY OF THE INVENTION

It is therefore an object of the present invention to provide an improved method and apparatus for forming containers from continuous webs of thermoplastic material.

Another object of the present invention is to provide an improved apparatus for forming containers out of continuous webs of plastic material wherein the apparatus is particularly designed for efficiently and rapidly applying an even layer of ink to a platen which is to be pressed against a portion of the formed container to print thereon.

A further object of the present invention is to provide improved method and means for applying ink to a surface.

A still further object of the present invention is to provide an improved printing roll which can rapidly apply an even coat of a fast drying ink to a printing platen.

Yet another object of the present invention is to provide an improved method and apparatus for forming containers out of continuous webs of plastic material wherein means are provided for selectively and instantaneously halting the movement of the drive means for the web of plastic material which is to be formed into a container and the different tools and implements moveable with the drive means and which act on the plastic material to form it into the container.

Another object of the present invention is to provide an improved mechanism for regulating the tension in a web of continuous material that is fed to a predetermined location.

Briefly, in accordance with the present invention, the foregoing and other objects are achieved by utilizing a web tensioning and feeding apparatus to feed a web of plastic material to a forming machine. The web tensioning and feeding apparatus includes means for holding a roll of plastic material and a tension bar which rests on the plastic material between the holding means and forming machine as it is fed to the forming machine to provide a relatively constant tension in the plastic fed to the forming machine. A set of idler wheels are located adjacent the roll of plastic material and are driven by a motor through belts and a second set of wheels with the belts being in contact with the roll of plastic material. Rotation of the motor and the two sets of wheels causes the belt by friction with the roll of plastic to so it can be fed to the forming machine. Switching means are provided for regulating the motor which controls the unrolling of the plastic material in accordance with the amount of plastic material that is being utilized by the forming machine.

The forming machine includes a first drive train which has a disc attached thereto with a caliper disc brake for the caliper disc. Actuation of the caliper disc brake will result in gripping of the caliper disc and instantaneously bringing the drive shaft of the machine and the printing, forming and blanking elements movable therewith to a complete and instantaneous halt. A plurality of caliper discs and mating caliper brakes apply a constant drag to a second drive train which moves the transport mechanism and which can be isolated or connected to the first drive train.

The mechanism for printing formed containers includes a metallic cylindrical inking roller having an ink holding surface such as diamond patterns of knurl-like indentation a gravure surface, or helical inking grooves on its surface. A motor through a shaft rotates the inking roller in a container of ink to ink the roller and means are provided for moving the inking roller transversely in rolling contact with a printing platen to ink the platen and override the motor so that there is no slipping between the inking roller and the platen. The roller has axial freedom about the shaft which rotates it and magnetic means are provided to hold the inking roller fixed relative to the support rollers upon which it rotates so that the inking roller will not float.

After the inking roller has inked the platen a drive train raises the platen so that the inking roller can be moved to its original position and the platen is pressed against a formed container printing thereon. By having an inking arrangement as disclosed herein it is possible to apply a rapid drying ink evenly to a printing platen so that the ink may be applied to a container and rapidly dry therefrom.

BRIEF DESCRIPTION OF THE DRAWINGS

Other objects, aspects and features of the present invention will be apparent from the following specification and drawings in which:

FIG. 1 is a perspective view of the web tension and feeding apparatus and forming machine disclosed herein;

FIG. 2 is an opened side elevational view of the web tension and feeding apparatus illustrated in FIG. 1;

FIG. 3 is a fragmentary plan view of the drive train of the machine disclosed herein and one of the means for bringing the rotation of the drive train and the elements movable therewith to an instantaneous and complete halt;

FIG. 4 is a perspective view looking from the side of the machine disclosed herein showing the drive train, the drive means for the printing apparatus and the means for bringing the drive train and the elements movable therewith to an instantaneous and complete stop;

FIG. 5 is an enlarged fragmentary vertical section showing the inking and printing apparatus disclosed herein and the drive means for these apparatuses;

FIG. 6 is a perspective view looking transverse of the machine disclosed herein showing the transverse drive and the rotating means for the printing and inking apparatus of the present invention;

FIG. 7 is an enlarged fragmentary vertical view of the printing and related drive apparatus disclosed herein;

FIG. 8 is a sectional side view of the printing and related drive apparatus disclosed herein;

DESCRIPTION OF THE PREFERRED EMBODIMENT

Figure 9:
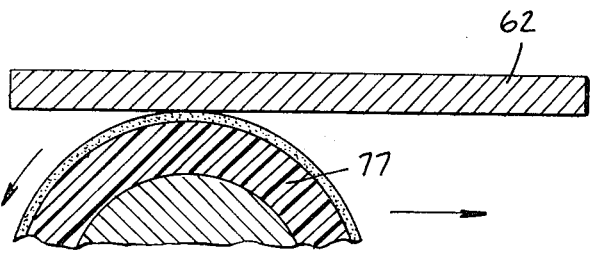
FIG. 9 is a view illustrating how the inking roller disclosed herein inks the printing platen.

Referring now to the drawings and FIG. 1 in particular wherein a web tension and feeding apparatus 11 is shown feeding a web of plastic material to a forming machine 10. Forming machine 10 of the present disclosure is similar to the forming machine as disclosed in my above-noted co-pending patent application and only those portions of the forming machine of the present application which differ from the forming machine disclosed in my co-pending application and which are part of the present invention are discussed in detail herein. Web tension and feeding apparatus 11 regulates the tension in the web of plastic material which is fed to forming machine 10 and the amount of feed of plastic to the machine. The plastic material which may be formed by machine 10 may be any one of a variety of materials such as expandable polystyrene form, biaxially oriented polystyrene sheet, high impact polystyrene, multipolymer, polypropylene, polyethalene, ABS, laminated construction, and other thermoplastic materials. As noted in my Co-pending patent application, the machine is adapted to form many types of plastic containers such as egg cartons, margarine tubs, cottage cheese containers, meat trays, etc.

Web tension and feeding apparatus 11 includes an upright frame 12 having parallel upright frame members 12a and 12b. Supported by upright frame members 12a and 12b is a cross bar 13 with a roller 14 rotatably mounted thereon.

Pivotally attached to frame members 12a and 12b is U-shaped tension and feed control member 15. Member 15 is seen to include opposed arms 15a and 15b and as the arms are identical to each other a description of arm 15a will suffice for an understanding of the present invention. Arm 15a includes sections 15c and 15d with section 15c having an enlarged portion 15e. An arm 15f extends rearwardly from actuating portion 15e, as viewed in FIG. 1, with a counter weight 15w located thereon. Section 15d includes a straight arm with sections 15d and 15c meeting each other about pivotal connection 15h, the pivotal connection being affixed to upright frame member 12b so that arm 15a is pivotable thereabout. Attached to one end of arms 15a and 15b is a bar 15k about which a roller 15L is free to rotate.

As can be seen in FIGS. 1 and 2, an inverted U-shaped bar 16 having two sides with side 16a being visible in FIG. 2 and a wheel support bar 16b has the bottom of its sides pivotably mounted about a bar 19. Bar 19 is pivotally mounted to the web tension and feeding apparatus near the bottom thereof. Rotatably mounted on wheel support bar 16b are a plurality of wheels 17 spaced along the length of the bar. Fixedly mounted on bar 19 are a plurality of drive wheels 20, there being the same number of drive wheels 20 as there are wheels 17 on bar 16b. Each drive wheel 20 is co-planar with a wheel 17 with a belt 18 coupling the co-planar wheels. Preferably belt 18 is a rubber V belt with wheels 17 and 20 having a recessed periphery to receive the V of the belt.

As can be seen in FIGS. 1 and 2 of the drawings a roll R of plastic material which is to be fed to forming machine 10 is mounted for rotational freedom about a bar 21. The drive for rotating wheels 20 and 17 is provided by a motor 22 which rotates a sprocket 23. A chain 24 is rotated by sprocket 23 and in turn rotates a sprocket 25 which may be symmetrical with shaft 19 and which rotates shaft 19. Located on arm 15b is a conventional mercury switch 26 which has the characteristics of having a differential between its closing and opening operating points. Rotation of member 15 in a counterclockwise direction results in changing the contact conditions of the switch so as to activate motor 22. Rotation of member 15 in a clockwise direction results in a contact condition in switch 26 that stops rotation of motor 22.

In normal operation belts 18 are positioned in contact with roll R so that rotation of motor 22, sprocket 23, chain 24, sprocket 25, shaft 19, wheels 20 and V belts 18 results in the unrolling of the material due to the friction between the material and the belts so the material goes over roller 14 and under roller 15L to be fed to machine 10. The weight of tension and feed control member 15 applied in the plastic material between roller 14 and machine 10 by roller 15L maintains a relatively constant weight on the plastic and hence a relatively constant tension therein and in the material that is fed to machine 10.

The height of roller 15L will depend on how rapidly machine 10 is drawing plastic from roll R. If machine 10 is drawing plastic from roll R while motor 22 is off the plastic extending from roller 14 to machine 10 has its height increased so that tension and feed control member 15 is rotated in a counterclockwise direction as viewed in FIGS. 1 and 2 and arm 15b is elevated. As a result switch 26 has its contact conditions changed so that motor 22 will be operated to cause more plastic to be fed to machine 10. This results in a decrease in the elevation of the plastic material extending from roller 14 to machine 10 causing tension and control member 15 to descend or rotate in a clockwise direction if the material being utilized by machine 10 is less than the feed from roll R with the motor on. If machine 10 continues to use plastic material slower than it is being unrolled from the roll R, the tension and feed control member will continue to rotate in a clockwise direction and cause the contact conditions of switch 26 to be changed to shut motor 22. While this is happening roller 15L will be resting on the material with the weight of the tension and control member maintaining a relatively constant tension therein. This cycle continues as long as machine 10 is operating insuring that properly tensioned material is directed thereto and that the material is unrolled as utilized by machine 10. As the diameter of the roll of plastic decreases the frictional contact between belts 18 and the plastic roll gradually swings the wheels and belt to the dotted position seen in FIG. 2. A biasing means could be used if desired to bias belts 18 against roll R to assist in maintaining contact between the belts and the roll as the diameter of the roll decreases.

The drive train for the machine is shown in FIG. 3 and is seen to include a main drive motor 30 which drives a sprocket 31, which is not visible in FIG. 3 due to its engagement with chain 32. A sprocket 33 is in engagement with chain 32 and is in engagement with clutch 34. When clutch 34 is engaged with motor 30 it rotates shaft 35 which is journaled in bearings 36 and keyed to sprocket 37. Chain 38 is in engagement with sprocket 37 and a sprocket that is rotatable with shaft 39a but not visible in FIG. 3. Shaft 39a is journaled in bearings 40a and located on the rightmost portion of shaft 39a, as viewed in FIG. 3, is one face of a jaw clutch 41. The other face of jaw clutch 41 is rotatable with a shaft 39b which is housed in bearings 40b. Rotatable with shaft 39a is the machine transport means 64 as described in my co-pending application and also movable with the shaft is a disc 44 which can be seen in FIG. 1. Caliper brakes 45 are automatically cycled into light braking contact with discs 64 to cyclically place a drag on the transport means. Shaft 39b controls movement of the machine forming and blanking means as described in my co-pending application as well as the printing means. A disc 45a is located on shaft 39b and is mated with caliper brake 44 to bring the disc, shaft 39b and the elements movable therewith to a complete and instantaneous halt when desired. With motor 30 rotating shaft 39b will rotate when clutches 34 and 41 are engaged.

An actuator 42, which may include a piston and cylinder arrangement, controls jaw clutch actuating rod 43 and the engagement of jaw clutch 41. It is possible to remove power from shaft 39b with motor 30 rotating by actuator 42 disengaging jaw clutch 41.

In FIG. 4 of the drawings the relationship between power shaft 39b and the control mechanism for the printing operations is shown. As can be seen in the figure, a two faced cam 50 is rotatable with shaft 39b by being keyed thereto or by any of the other conventional techniques known to the skilled mechanic. Cam 50 includes a track 51 located on its left face as viewed in FIG. 4 and another track on the right face which is not visible in FIG. 4 (hereinafter referring to these faces and tracks for illustrative purposes as the left and right faces and left and right tracks, respectively). Located in left track 51 is a follower 52 with the follower being rigidly connected to an ink roller control lever 54.

Ink roller control lever 54 at its bottom-most portion, as shown in FIG. 4, is pivotably mounted about a shaft 53 which is fixed rigid to machine 10. In a similar fashion a follower is located in the right track of cam 50 with the follower for this track being joined to platen control lever 55. As with lever 54, lever 55 is pivotally mounted on its bottom-most portion of shaft 53. Lever 54 at its top most portion is pivotally attached to an adjustable inking control link 56 whereas lever 55 at its uppermost portion is pivotally connected to a tie rod 57. As can be seen in FIG. 5, adjustable inking control link 56 includes members 56a and 56b with the members being movable relative to each other.

An inking drive motor 70 is fixed relative to machine 10 and is fixed to rotate via shaft 71 a sprocket 72. A chain 73 is rotatable with sprocket 72 and in turn rotates a free floating double sprocket 74 which is rigidly secured to sprocket 72 by link 98, sprocket 74 being clearly shown in FIG. 6. Sprocket 74 is a double sprocket as it includes two sets of teeth with chain 73 being in mesh with one set of teeth and a chain 75 being in mesh with the other set. As shown in FIG. 7, chain 75 is in mesh with a sprocket 76 which rotates via a one way clutch 100 a shaft 97 and, via shaft 97, an inking roller 77. As can be seen in FIGS. 6 and 7 shaft 97 extends through inking roller 77 and pinion 85 to be coupled to one-way clutch 87, the clutch also being coupled to the pinion. Pinion 85 has the same pitch diameter as inking roller 77 for a reason soon to be apparent and is in mesh with rack 86, which is held fixed as can clearly be seen in FIG. 6. A rack, not seen in the Figs., is parallel to rack 86 and a pinion rotates thereon. The pinion is coupled via a shaft and gearing to pinion 85 and is coupled to the opposite side of the inking transport means as is pinion 85 to prevent the inking transport means from jamming or skewing on rack 86 if this were the only rack. This arrangement is similar to the arrangement for the heating station in my co-pending application.

Inking roller 77 is located in an inking container 79 with rollers 81 attached to the top of the container. Rollers 81 are adapted to roll along a track 80 which runs transverse to the major axis of the machine when the inking roller inks the platen as hereinafter described. A slotted link 121 extends between double sprocket 74 and sprocket 76 with the free end of lever 56b slideable therein.

The printing mechanism of the present invention is clearly illustrated in FIGS. 7 and 8 with roller 77 being a hollow metallic cylindrical member and including helical grooves 77a with the pitch of the grooves preferably being about 120 lines/inch. The ends of the helical grooves are flat so as not to cut into the platen during inking of the platen. Alternatively, inking roller 77 could have a gravure engraved surface, a diamond patterned surface etc. Roller 77 includes an end plug 77b and is loosely fitted on shaft 97 so as to rotate therewith but to have radial freedom with respect to the shaft. This can be accomplished by any technique available to the skilled mechanic.

Inking roller 77 is supported on support rolls 78 which are located within and fixed to inking container 79 and serve to support the inking roller as it rotates. The bottom portion of inking roller 77 extends into the ink in inking container 79 with the right most roller 78, as viewed in FIG. 8, wiping off excess ink from the rotating inking roller, which always rotates in a counter-clockwise direction as viewed in the Figs. Cover plates 93 and 94 are affixed to the top of inking container 79 and serve to minimize the evaporation of ink from the container. A continuous supply of ink is adapted to be directed to inking container 79 with ink drawn from the container through line 92 to a vacuum tank 110 and directed thereto via pump 111 and line 91.

Figure 12:
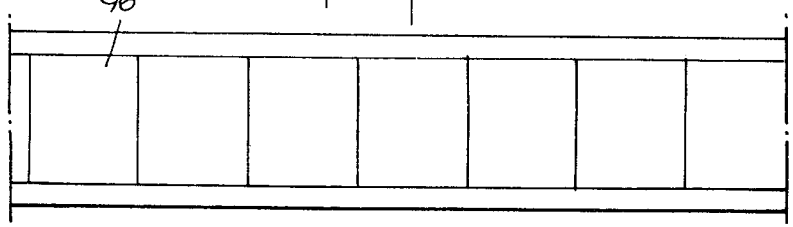
FIG. 12 is a schematic illustration showing the permanent ceramic magnets which are disclosed herein to hold the inking roller fixed about its axis.
Figure 13:
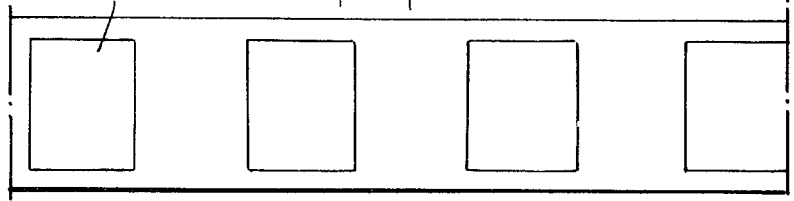
FIG. 13 is a schematic illustration showing how the permanent ceramic magnets illustrated in FIG. 12 may be rearranged so as to provide different magnetic forces on the inking roller disclosed herein.

In order to keep inking roller 77 in contact with roller 78 a row of ceramic magnets 90 are located near the bottom portion of inking container 79 and extend thereacross parallel to the rotational axis of the inking roller, as seen in FIGS. 7, 12 and 13. These magnets due to their attraction with inking roller 77 firmly hold the inking roller against rollers 78. Preferably there will be nine magnets in the row with openings between the magnets and the number of magnets in the row interchangeable as seen in FIGS. 12 and 13, the magnets may be ¾ by 1 inch in cross section.

By utilizing these magnets along with rollers 78 inking roller 77 is always in contact with rollers 78 and will not float on shaft 97 so as to be accurately positioned when the platen is inked thereby. The system of using a floating inking roller, which is magnetically attracted to rollers 78, has a number of advantages. In the prior art, the inking rollers were rigidly secured to a shaft which rotated the inking roller and thus required an intricate bearing arrangement in order to fix the inking roller concentric with the shaft which rotated it. The present invention eliminates the need for this intricate bearing arrangement and is of a simple construction and can apply an even coat of rapidly drying ink to a surface.

Platen 62 is connected to a link 58 which is fixed to shaft 59 and to drive link 60. Shaft 59 being rotatable with respect to the machine. Movable with link 58 is a drive arm 60 which is joined to a platen drive shaft 61, the free end of platen drive shaft 61 being connected to platen 62. Directly located below platen 62 are mandrels 63 as described in my co-pending patent application. Link 58 is slotted so that movement of drive arm 57 will result in rotation of link 58 and rotation of drive arm 60 with the result being vertical movement of platen drive shaft 61 and the platen 62. The connection between drive arm 60 and shaft 61 is such that rotation of drive arm 60 will result in only vertical movement of platen 62.

OPERATION

In normal operation web tension and feeding apparatus 11 unrolls the plastic material from roll R and feeds it to the gripping means of machine 10 under a predetermined tension as the machine utilizes the plastic. Machine 10 advances the plastic material to the heating and forming stations of the machine with the drive from shaft 39a rotating the gripping transport mechanism for the plastic as disclosed in my co-pending application. Shaft 39b controls the operation of the forming and blanking station as disclosed in my co-pending application. Motor 70 rotates inking roller 77 in a counter-clockwise direction, as viewed in FIGS. 5 and 9, via shaft 71, sprocket 72, chain 73, double face sprocket 74, chain 75, sprocket 76, clutch 100 and shaft 97. Clutch 87 is now disengaged. The rotation of inking roller 77 within inking container 79 will insure that a continuous film of ink is evenly applied to the surface of the roller. The inking roller 77 is held fixed to rollers 78 as previously described.

With the inking platen in the position illustrated in FIG. 5 rotation of double face cam 50 will cause follower 52 and lever 54 to move to the right as viewed in FIG. 5. This will pull lever 56 and, via link 121, the inking roller to the right, as viewed in FIG. 5, with rollers 81 rolling along track 80 and sprocket 74, which is free floating, will move in a generally upward path with link 98 rotating slightly in a clockwise direction. The location of the movement of the inking roller to the right can be adjusted by moving elements 56a and 56b relative to each other. As a result of inking roller 77 moving to the right, pinion 85 will roll along rack 86 with clutch 87 engaged and clutch 100 disengaged so that shaft 97 will rotate with the same angular velocity as pinion 85 rotates as it is drawn along rack 86. The rotation of the shaft and hence the roller will be faster than when motor 70 is rotating these elements. Since the diameter of roller 77 and pinion 85 is the same, the linear velocity of the pinion relative to the rack will be the same as the linear velocity of the inking roller relative to the stationary platen with the surface of the inking roller rolling in a counter-clockwise direction along the bottom of the platen, as viewed in FIG. 9, as the inking roller moves to the right of the platen. As there is no slippage between the pinion and rack due to the positive engagement of their teeth there is no slipping between the inking roller and the platen as the roller rolls along the platen and an even layer of ink will be applied to the platen. The magnets which act on the inking roller will set up an eddy current which acts as a brake on the rotation of the roller so that all the backlash in the roller is taken up as it rotates. During this time the follower on the right track of double face cam 50 will be dwelling with the platen remaining in the position shown in FIG. 5.

Figure 10:
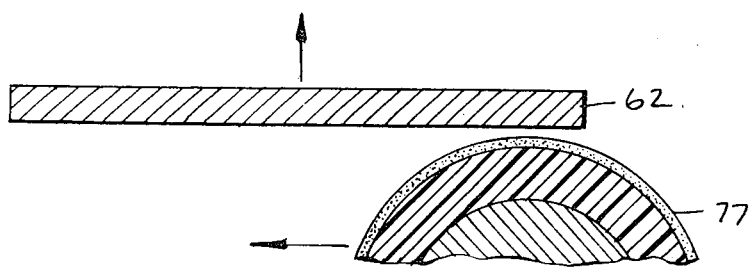
FIG. 10 is a view illustrating the relative movement between the printing platen and inking roller disclosed herein after the inking roller has inked the platen.

Once the inking roller has completely transversed the printing platen rotation of cam 50 will cause follower 52 and lever 54 to move to the left as shown in FIG. 5. This will cause rack 86 to rotate pinion 85 with clutch 87 now being disengaged so that motor 70 via shaft 97 and clutch 100 is rotating roller 77. While this is happening the follower in the right track of double face cam 50 will move to the left as the cam is rotating pulling lever 55 and tie rod 57 to the left causing links 58 and 60 to rotate in a clockwise direction. This elevates drive arm 61 and platen 62 so that the platen is elevated, as shown in FIG. 10, on the movement of the inking roller to the position shown in solid lines in FIG. 5 to prevent contact between the roller and platen.

Figure 11:
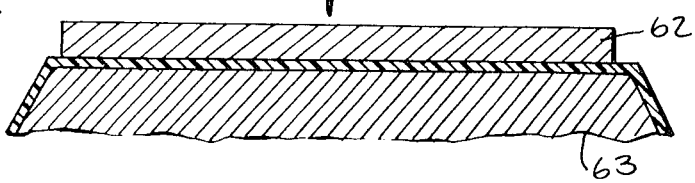
FIG. 11 is a view showing how the platen disclosed herein prints on a container.

Continued rotation of cam 50 causes the follower in the right track to move lever 55 to the right while follower 52 dwells. Movement of lever 55 and tie rod 57 to the right, as shown in FIG. 5, results in counterclockwise rotation of links 58 and 60 so printing platen 62 prints a container as illustrated in FIG. 11.

Continued roation of cam 50 results in the platen being moved to the position shown in FIG. 5 with the inking mechanism being maintained in the position shown in solid lines in FIG. 5 as a result of idler 52 dwelling in its track. As the platen is elevated after printing on the containers the printed containers are advanced to the blanking and cutting station as described in my co-pending patent application to be cut from the web of plastic material and then stacked.

The apparatus disclosed herein is specifically designed to use a rapidly drying ink such as a water or alcohol based ink and can apply the ink evenly to platen 62. These types of inks dry so fast that they will be dry as the container leaves machine 10 so that items may be packaged immediately therein without having to store the container in valuable storage space while the ink dries.

I claim:
1. Container forming apparatus for forming containers from a web of material and printing on the formed containers comprising:
 a. means for supporting a roll of the material so the roll is free to rotate about its axis and be unrolled,
 b. selectively actuatable movable means adapted to be in frictional contact with the roll of material to unroll the material upon being moved,
 c. a forming machine including container forming means,
 d. means to transfer the material from the roll to the forming machine and for applying a relatively constant tension to the material as it is being so transferred and for controlling the movement of said movable means and thus the unrolling of the material from the roll in accordance with the consumption of the material by the machine,
 e. a printing platen having a printing surface located within the machine,
 f. an inking roller within the machine and movable between a first and second position,
 g. means for moving said inking roller from the first position to the second position and in so doing rotating said inking roller so that said inking roller will roll along said platen printing surface to ink said surface and after inking said platen printing surface move said inking roller back to the first position,
 h. means for preventing contact between said platen printing surface and said inking roller as said inking roller is moved from said second position to the first position and for bringing said platen printing surface into contact with the container to print thereon after the inking roller is returned to the first position,
 i. said inking roller being defined by a cylindrical member having helical grooves on its periphery, and
 j. means for instantaneously halting movement of said container forming means, said printing platen, the movement of said inking roller between first and second positions, said inking roller moving means and said means for preventing contact between said inking roller and said platen as said inking roller is moved from the second position to the first position and the movement of said platen toward the container.

2. An apparatus according to claim 1 wherein said instantaneously halting means comprises a braking means.

3. An apparatus according to claim 2 wherein said braking means includes a caliper disc rotatable with said movements, and a caliper brake for said caliper disc for halting rotation of said caliper disc and thereby halting said movements.

4. A container forming apparatus according to claim 2 and further comprising:
 a rotatable power shaft, said braking means being connected to said power shaft,
 main drive means for driving at least a portion of said apparatus and said power shaft, and
 a clutch for selectively disconnecting said rotatable power shaft with respect to said main drive means,
 whereby the drive to said rotatable power shaft can be disengaged by said clutch and said rotatable power shaft can be stopped by said braking means.

5. The apparatus according to claim 4 wherein said clutch is a jaw clutch.

* * * * *